Jan. 9, 1962 J. S. COURTNEY-PRATT 3,015,959
ACCELEROMETERS
Filed April 25, 1960

INVENTOR
J.S. COURTNEY-PRATT
BY
H. O. Wright
ATTORNEY

United States Patent Office 3,015,959
Patented Jan. 9, 1962

3,015,959
ACCELEROMETERS
Jeofry S. Courtney-Pratt, Springfield, N.J., assignor to Bell Telephone Laboratories, Incorporated, New York, N.Y., a corporation of New York
Filed Apr. 25, 1960, Ser. No. 24,404
3 Claims. (Cl. 73—517)

This invention relates to accelerometers. More particularly, it relates to accelerometers which employ a plurality of piezoresistive members.

With the advent of artificial satellites, guided missiles and the like the need for small, light, accurate and sensitive accelerometers has become acute. The discovery of the fact that a number of materials including specific cuts of single crystals of such materials as silicon and germanium have much greater and more sensitive piezoresistive properties than was formerly suspected makes possible the solution of heretofore vexing problems in connection with the provision of small, light devices which will effect the detection and accurate indication of the acceleration of moving objects.

A piezoresistive material is one the electrical resistance of which changes with change in the mechanical stress to which the material is subjected. For many of the more sensitive materials the direction of the resistance change, that is, toward an increased or decreased value with change in stress, is reversed when tension is substituted for compression, or vice versa. This matter is discussed in some detail in the copending companion application of F. T. Geyling, Serial No. 24,403, filed concurrently on April 25, 1960, with the present application and assigned to applicant's assignee, and also in the copending joint application of applicant and W. P. Mason, Serial No. 794,173, filed February 18, 1959, which is likewise assigned to applicant's assignee. Applicant's above mentioned joint application with W. P. Mason matured as Patent 2,963,911, granted December 13, 1960.

The principal object of the present invention is, accordingly, to facilitate the accurate detection and measurement of the acceleration of a moving body.

A further object is to reduce the size and weight of acceleration measuring devices.

These objects are achieved by utilizing forces resulting from the inertia of a mass which is being subjected to the acceleration to be determined so as to apply stresses to a plurality of members of piezoresistive material, some of the members being subjected to tension and the remaining members being subjected to compression. By electrically incorporating the members in an appropriately balanced electrical circuit of the type commonly designated as a Wheatstone bridge circuit the resistance changes of the members can serve under appropriate circumstances to unbalance the circuit to a degree proportional to the acceleration and thus operate an electrical indicator, the reading of which is also proportional to the magnitude of the acceleration. In most instances a sense of the direction of the acceleration is also provided by the circuit. The utilization of sensitive piezoresistive materials such as silicon or germanium makes possible a substantial reduction in the size and weight of the devices.

The above and additional objects, features and advantages of the invention will become apparent from a perusal of the following detailed description of illustrative arrangements embodying the principles of the invention.

Figure 1:
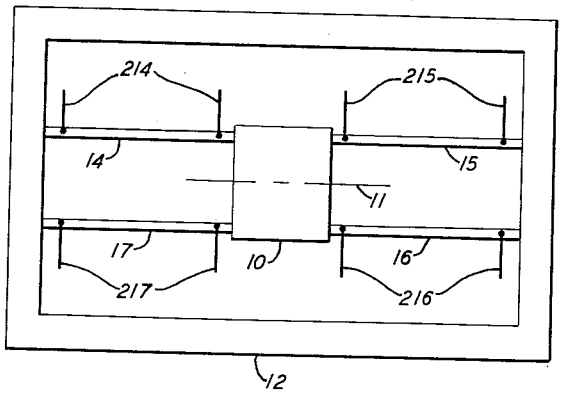
FIG. 1 illustrates a mechanical structure which can be employed in devices of the invention.

In more detail in FIG. 1, a mass 10 which may be a cube, a sphere, a cylinder, or which may be of any conformation which is symmetrical about the horizontal plane including axis 11 is attached to a rigid supporting means, for example, to a rigid frame 12, by two pairs 14, 15 and 16, 17, respectively, of like elongated piezoresistive members. The members of each pair extend oppositely from mass 10 along a common longitudinal axis to supporting frame 12. The two common longitudinal axes of the two respective pairs are parallel to axis 11 and to each other. They are preferably equally spaced from axis 11 on opposite sides of axis 11 and lie in a common plane which includes axis 11. Mass 10 and frame 12 can be of electrically insulating material, or alternatively, members 14 through 17, inclusive, can be attached to mass 10 and frame 12 by a strongly adhesive material having good electrical insulating properties. A suitable adhesive material is, for example, an epoxy resin such as those furnished under the trademark "Araldite."

Each of the members 14 through 17, inclusive, has a pair of electrical leads designated 214 through 217, inclusive, respectively, connected to its ends as shown in FIG. 1. These leads are preferably attached to their respective members by thermocompression bonding as taught in the copending joint application of O. L. Anderson and H. Christensen, Serial No. 619,639, filed October 31, 1956, or by twist compression bonding as taught in the copending joint application of O. L. Anderson, P. Andreatch and H. Christensen, Serial No. 647,886, filed March 22, 1957, both of which copending applications are assigned to applicant's assignee.

Members 14 through 17, inclusive, should be identical and vary in like manner with respect to their respective electrical resistances as measured between the leads attached to them as above described for all stresses of either tension or compression within the ranges of stress in which they are to be employed.

Figure 2:
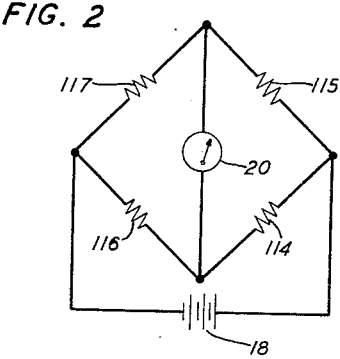
FIG. 2 illustrates a first simple electrical schematic diagram of a circuit arrangement for use in connection with devices of the invention.

In FIG. 2 a first simple Wheatstone bridge circuit is shown in which the four resistance arms 114 through 117, inclusive, represent the resistances of members 14 through 17 inclusive, respectively, of FIG. 1. A direct current supply 18 is connected across one diagonal of the bridge circuit and a voltmeter 20 is connected across the other diagonal of the bridge. Meter 20 is preferably of the zero-center type for reasons which will presently become apparent.

When the members 14 through 17 of FIG. 1, the electrical resistances of which are designated 114 through 117, respectively, are connected in the circuit of FIG. 2, as shown, if the assembly of FIG. 1 is subjected to linear acceleration having a component parallel to the axis 11 and directed toward the right, members 15 and 16 will be subjected to tension and members 14 and 17 will be subjected to compression and the resistances of members 15 and 16 (that is, resistances 115 and 116, respectively) will change, for example, they will increase, by like amounts. Simultaneously, the resistances 114 and 117, respectively, of members 14 and 17 will, since they are being subjected to compression, change by like amounts in the opposite way, for example they will decrease.

Assuming the bridge circuit of FIG. 2 was accurately balanced with the assembly of FIG. 1 at rest, it will obviously become unbalanced when the assembly is subjected to acceleration and a reading will be obtained on meter 20 which will be proportional to the magnitude of the acceleration. The direction from its zero-center toward which meter 20 is deflected will obviously indicate the direction of the acceleration, for example to the right or left, respectively, along the axis 11.

It is likewise apparent that if the assembly of FIG. 1 is subjected to linear acceleration having a component parallel to axis 11 and directed toward the left, then members 14 and 17 will be subjected to tension and members 15 and 16 will be subjected to compression and for the circuit of FIG. 2 meter 20 will be deflected in the opposite direction.

In other words, linear accelerations parallel to axis 11 cause changes between the two resistances comprising the members of each pair but cause the same resistance change in the corresponding members, right or left, of the two pairs.

Assuming that the assembly of FIG. 1 is subjected to torsional or rotational acceleration, for example in a counterclockwise direction in the plane of the drawing, and members 14 through 17, inclusive, are still connected in the circuit of FIG. 2, then members 15 and 17 will be subjected to compression and members 14 and 16 will be subjected to tension. While the resistances of the members change, it is obvious that equal changes in resistances 115, 117 in one sense (for example, increasing) and equal changes in resistances 114, 116 in the other sense (decreasing) will not result in unbalancing the bridge circuit of FIG. 2. Accordingly, it is apparent that the circuit of FIG. 2 will not provide indications of torsional or rotational acceleration.

Figure 3:
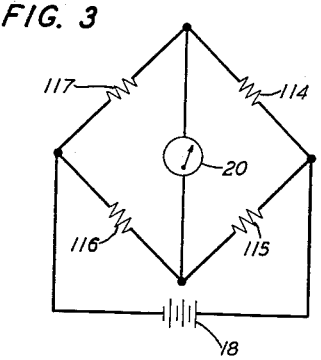
FIG. 3 illustrates a second simple electrical schematic diagram of a circuit arrangement for use in connection with devices of the invention.

If, however, the members 14 through 17, inclusive, are connected to form a bridge circuit in the manner indicated in FIG. 3, it is apparent that the strains to which members 14 through 17 are subjected when the assembly of FIG. 1 is subjected to torsional or rotational acceleration in the plane of the drawing will result in resistance changes (114 and 116 will vary in one sense and 115 and 117 in the other sense). This will, obviously, unbalance the bridge circuit of FIG. 3. Consequently, the bridge circuit of FIG. 3 can provide indications of torsional or rotational acceleration and the direction of deflection of meter 20 of FIG. 3 will indicate the direction, clockwise or counterclockwise, respectively, of the acceleration. Conversely, it is readily apparent that the circuit of FIG. 3 will not provide indications of linear acceleration parallel to the axis 11. It is apparent that the circuits of FIGS. 2 and 3 differ only in that resistances 114 and 115 have been interchanged.

It should be noted that torsional or rotational acceleration not only causes a change between the resistances of each pair of members but also causes a change between the resistances of the corresponding members, right and left respectively, of the two pairs.

Figure 4:
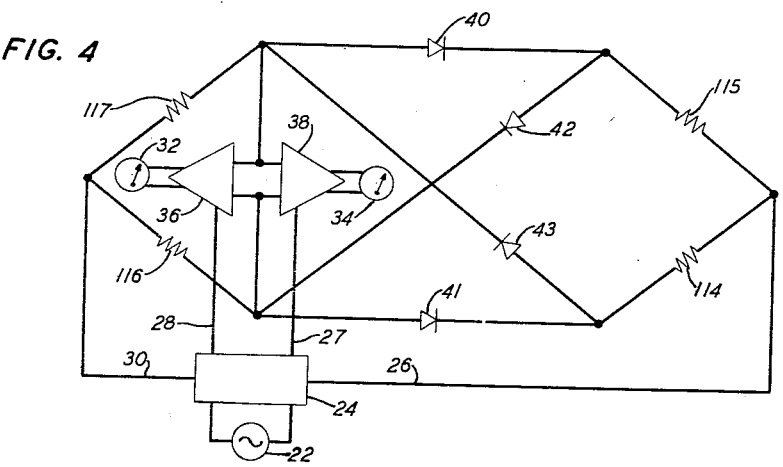
FIG. 4 illustrates an electrical schematic diagram of a more complex circuit arrangement for use in connection with devices of the invention.

To provide a circuit which will indicate both linear acceleration parallel to axis 11 and torsional or rotational acceleration in the plane of the drawing a circuit such as that illustrated by the schematic diagram of FIG. 4 can be employed.

In the circuit of FIG. 4 a conventional trigger or flip-flop circuit 24 is employed to provide a series of alternately positive and negative square electrical pulses. A conventional circuit of this type is described, for example, in the book entitled "Radio Engineering," third edition, by F. E. Terman, published by McGraw-Hill Book Company, Inc., New York, 1947, see pages 595 and 596 and FIG.12–12 on page 596. The timing of the pulses is controlled, for example, in conventional manner by energy from an alternating current supply 22. The four diodes 40 through 43, inclusive, are connected in a conventional arrangement to act as a "reversing switch" responsive to the polarity of the applied pulse which for one polarity of pulses from unit 24 effectively connects resistances 114 and 115 into a bridge circuit with resistances 116 and 117 in the manner shown in FIG. 2 and for the other polarity of pulses from unit 24, resistances 114 and 115 are effectively connected into a bridge circuit with resistances 116 and 117 in the manner shown in FIG. 3.

Amplifiers 36 and 38 can be of the conventional vacuum tube type which can be "gated" or turned on or off by, for example, the application of appropriate pulses to a suppressor grid of a vacuum tube and are arranged to be alternately turned on and off by such appropriate pulses derived from unit 24. The arrangement is such that when positive pulses are being impressed across the horizontal diagonal of the bridge formed by resistances 114 through 117, inclusive, one amplifier is operative and the other is inoperative, while when negative pulses are being impressed across the horizontal diagonal of the bridge the other amplifier is operative and the one amplifier is inoperative. Accordingly, it is apparent that one of the meters 32, 34 will provide indications of linear acceleration, if any, having a component parallel to axis 11 of FIG. 1 and that the other meter will provide indications of torsional or rotational acceleration, if any, in the plane of the drawing. In other words, the circuit of FIG. 4 may be said to combine the functions of the two circuits illustrated in FIGS. 2 and 3, respectively.

While the accelerometer described hereinabove will respond only to linear acceleration having a component parallel to axis 11 and to rotational acceleration having a component in the plane of the drawing, it is apparent that three such devices arranged orthogonally (that is, with the plane of each accelerometer corresponding to the plane shown in FIG. 1 perpendicular to each of the corresponding planes of the other two) will provide sufficient intelligence to make possible the determination of linear and rotational accelerations in all directions and all planes, respectively.

The above-described embodiments are illustrative of the application of the principles of the invention. Numerous and varied modifications and variations of the arrangements disclosed can be readily devised by those skilled in the art without departing from the spirit and scope of the invention.

What is claimed is:

1. A combination for use in an accelerometer comprising a mass, a rigid supporting means extending around and spaced from the mass, four like elongated piezoresistive members, a first pair of the members extending along a first common longitudinal axis, in opposite directions from the mass to the supporting means, the other pair of the members extending along a second common longitudinal axis, spaced from and parallel to the first axis, in opposite directions from the mass to the supporting means, whereby linear acceleration of the supporting means parallel to the common longitudinal axes of the pairs of members will cause a change between the resistances of the members of each pair but no change between the resistances of the corresponding members of the two pairs, and torsional or rotational acceleration will cause a change between the resistances of each pair and also between the corresponding members of the two pairs.

2. The combination of claim 1 and an electrical circuit incorporating the resistances of the two pairs of piezoresistive members and responsive to the relative changes in resistance of the members for linear and torsional or rotational acceleration, respectively, to provide indications of the amplitudes of the respective accelerations when one or the other of the accelerations is acting on the supporting means.

3. An accelerometer comprising a mass supported within a frame member by two pair of oppositely extending, like, elongated, piezoresistive members, each pair of members having a common longitudinal axis, the common longitudinal axes of the two pair of members being parallel to and spaced from each other, means for electrically connecting to each end of each member and an electrical circuit incorporating the electrical resistances of the four members in a balanced bridge circuit, a source of electrical energy electrically connected across one diagonal of the bridge circuit and an electrical voltmeter electrically connected across the other diagonal of the bridge circuit, the resistances of the members being electrically connected into the electrical bridge circuit so as to unbalance the bridge circuit when in response to acceleration of the device the resistances of the members of each pair change with respect to each other and the resistances of corresponding members of the two pair also change with respect to each other.

References Cited in the file of this patent

UNITED STATES PATENTS

| | | |
|---|---|---|
| 2,377,212 | Cottrell | May 29, 1945 |
| 2,638,335 | Kammer et al. | May 12, 1953 |
| 2,905,771 | Burns | Sept. 22, 1959 |

FOREIGN PATENTS

| | | |
|---|---|---|
| 772,835 | France | Aug. 20, 1934 |